Patented Mar. 22, 1938

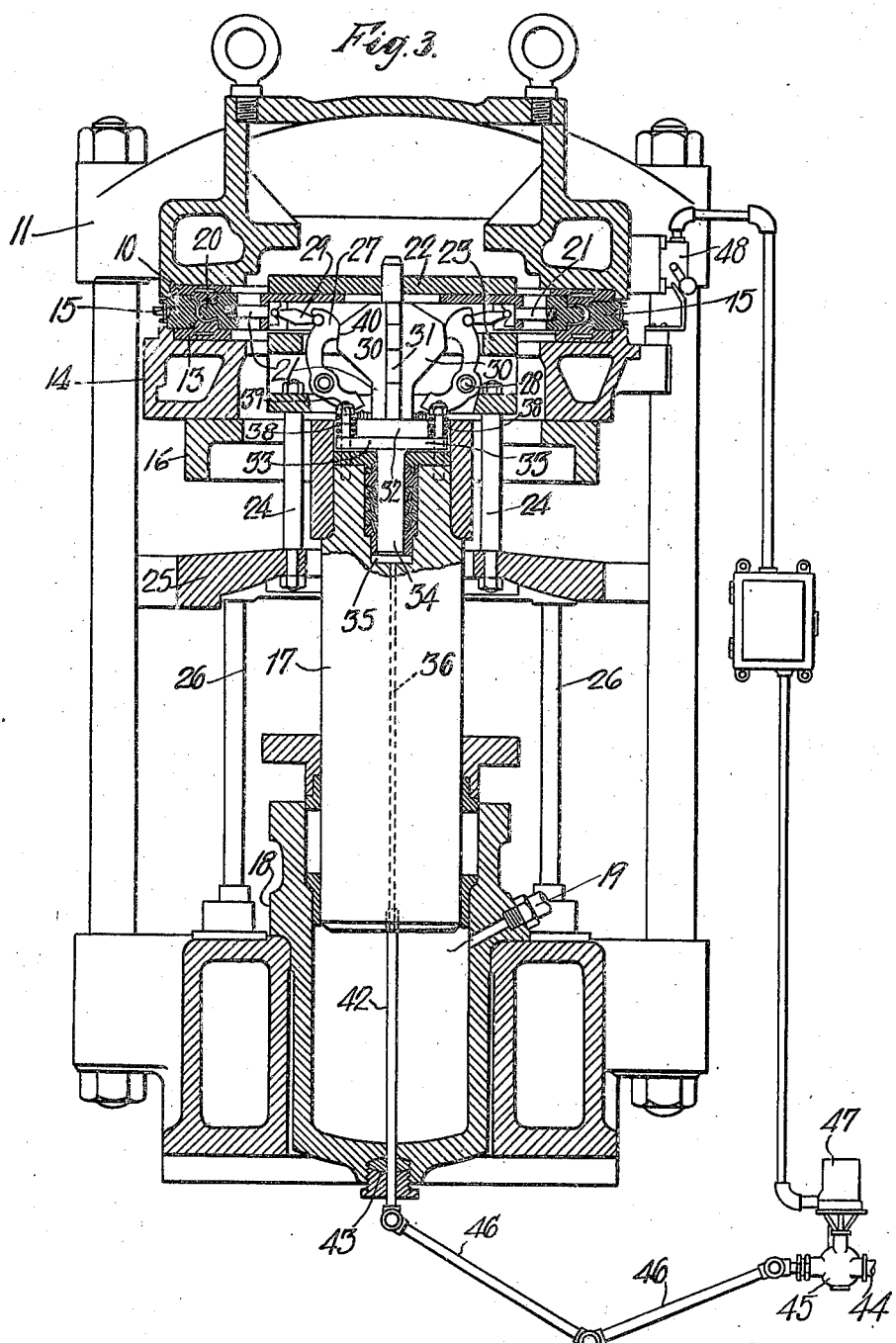

2,112,187

UNITED STATES PATENT OFFICE 2,112,187

TIRE MOLDING APPARATUS

Harry Willshaw, Wylde Green, Erdington, Birmingham, England, assignor to Dunlop Rubber Company, Limited, London, England, a British company Application February 20, 1937, Serial No. 126,891
In Great Britain January 24, 1936

5 Claims. (Cl. 18—17)

My invention relates to molding apparatus having an annular outer part or shell and an inner part or metal core between which articles such as rubber tires may be molded and cured.

In molding apparatus of the above type as hitherto constructed, no expansion of the core could take place after the outer or mold shell had been closed, nor could such core be resiliently loaded or expanded under a resilient load after the shell was closed. As a result the exudation of the rubber through the interstices of the molds forming what is known as "spue" could not be avoided, or only with great difficulty.

In my present invention I overcome the above disadvantages and provide molding apparatus of the above type in which the mold shells forming the outer part of the mold can be closed before the core is expanded into its final position, or in which the final stage of the core expansion may be effected by means acting independently of that for closing the mold shells; and in which, therefore, the core may be resiliently loaded for its final expansion. This gives a better distribution of mold pressure between the core and mold and an improvement in the compacting together of the rubber and compounding ingredients.

In my invention I provide a pair of complementary mold shell halves or mold shells of annular shape which move to closed and open position on a common axis. Preferably, one of the mold halves is fixed and the other is movable. Positioned between these mold shell parts is a core which is spaced from each of the parts when open, and projects into the annular space within the mold when the shell is closed. The core is expansible and is expanded as the shell parts close. It is movable independently of the shell parts and may continue to expand after the latter are closed.

In the preferred embodiment of the invention fluid pressure means is provided to move the movable mold shell parts to closing position and also to move the core into position within the mold shell thus formed. The mechanism for expanding the core is also pneumatically operated and when the shell closing mechanism reaches the end of its movement, the fluid pressure continues to act upon the core expansion mechanism and expands or enlarges the latter and puts it under the pneumatic or fluid pressure load which serves resiliently to expand the core into the mold shell.

The various features of the invention are illustrated by way of example in the accompanying drawings, in which—

Fig. 3 is a view similar to that of Fig. 2 of a modified embodiment of the invention.

Figure 1:
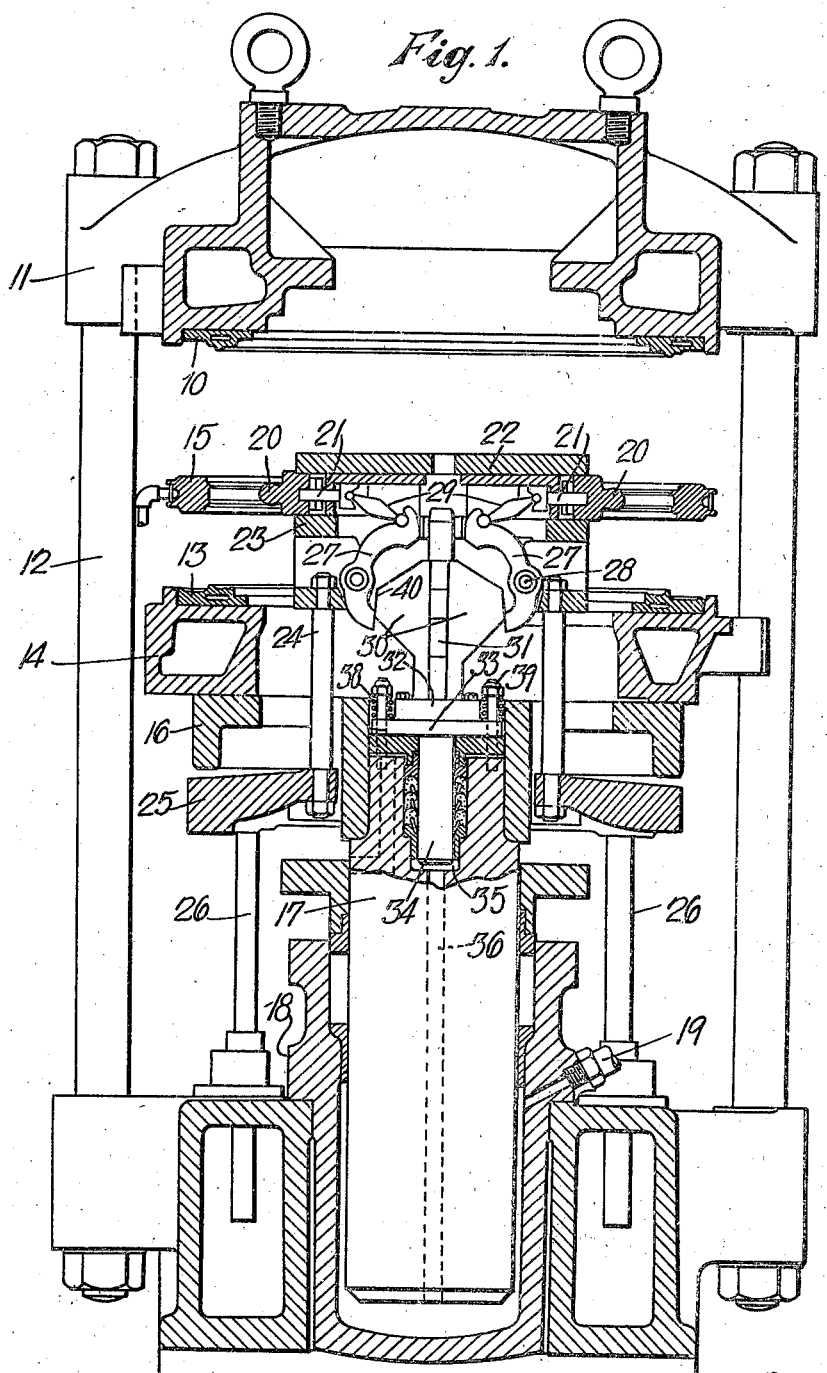
Fig. 1 is a vertical section of a tire mold apparatus embodying a preferred form of my invention, the apparatus being shown in open position.
Figure 2:
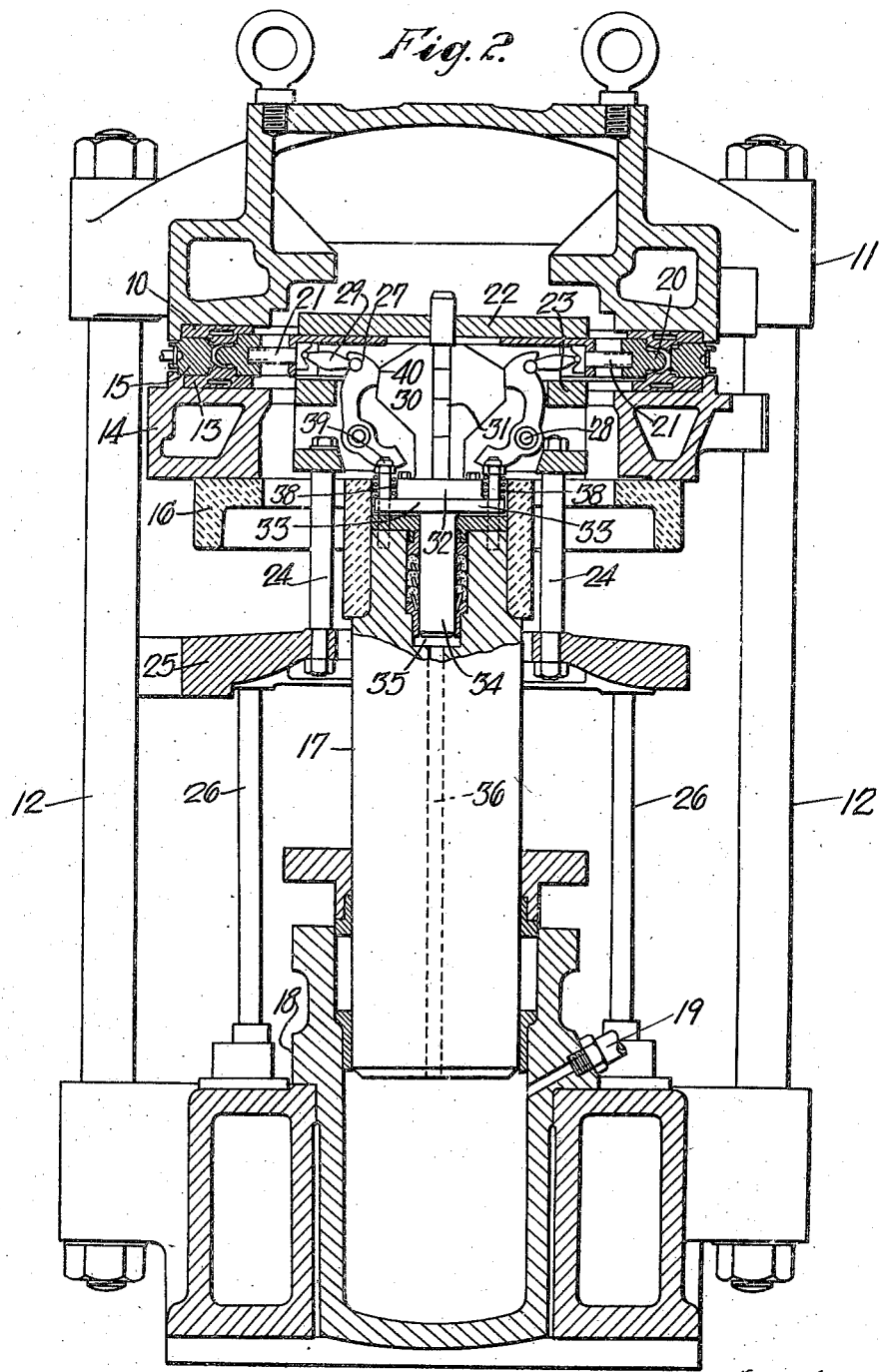
Fig. 2 is a similar section showing the apparatus in closed position.

Referring more particularly to Figs. 1 and 2, the invention is shown as embodied in apparatus comprising an upper side element 10 fixed in position on the upper part or cross piece 11 of a frame 12, a lower side element 13 mounted on a movable ring 14, and a central or tread element 15 also movable and positioned between the outer elements 10 and 13. The ring 14 that carries the lower side element 13 rests upon a platform 16 carried on the upper end of a vertically movable piston 17. The piston 17 is movable vertically in a cylinder 18 which is supplied with fluid under pressure through an inlet pipe 19 to lift the platform 16 and with it the side element 13 from the position shown in Fig. 1, to that shown in Fig. 2. In this movement the central ring or element 15 will be closed between the upper and lower side elements 10 and 13 to complete the shell.

An expansible metal core 20 is mounted to move with the central element 15 and to expand as the mold elements are closed. For this purpose the core elements are mounted on radially slidable rods 21 between an upper plate 22 and a lower double ring 23. The ring 23 is, in turn, supported on posts 24 mounted at spaced intervals on a lower ring 25 and the latter is, in turn, mounted on vertically slidable rods 26.

As the piston 17 is forced upwardly by fluid pressure supplied through the pipe 19, it lifts with it the central ring or mold part 15, carrying the latter and the core 20 upwardly to the position shown in Fig. 2.

As the various mold parts come to closed position, the expansible core elements are pushed outwardly by levers 27 arranged in radial planes at spaced intervals on horizontal pivots 28 on the ring 23 and connected at their upper ends to the rods 21 by links 29. The levers 27 are rocked outwardly at their upper ends by individual cams 30 mounted on a vertical rod 31 extending upwardly from a horizontal platform 32 at the upper end of the piston 17. The platform 32 does not rest directly on the piston 17, but on a plate 33 on the upper end of an inner piston 34 extending downwardly into a cylinder 35 formed in the upper end of the piston 17. The cylinder 35 communicates with the cylinder 18 by means of a passageway 36 extending downwardly through the piston 17. When fluid under pressure is admitted through the pipe 19 into the cylinder 18, it also passes through the passageway 36 into the cylinder 35 and exerts an upward pressure on the piston 34 and thence on the plates 33 and 32. These plates are, however, prevented from moving upwardly relative to the piston 17 by springs 38 confined between the plate 33 and a nut 39 on the upper ends of stems mounted in the upper end of the piston 17 and extending through the plates. However, when the side element 13 closes upwardly against the ring 15 and side element 10 and thus stops the further upward movement of the piston 17, pressure builds up within the cylinder 18 and is transmitted through the passage 36 to the piston 34 and serves to move the latter upwardly against the action of the springs 38. This final upward movement brings the inclined surfaces 40 of the respective cams 30 against co-acting faces 41 on the upper ends of the levers 27, thereby forcing the latter outwardly under magnified pressure resiliently imparted from the pressure fluid. If necessary, fluid of higher pressure may be admitted to the cylinder 18, passage 36 and piston 34 for this final movement.

For the final upward movement of the cams 30 and outward expansion of the core 20 the construction shown in Fig. 3 may be used. In this modification the passage 36 is connected directly to a pipe 42 which passes through a stuffing box 43 in the lower end of the cylinder 18. The pipe 42 slides upwardly and downwardly with the piston 17 and, during this upward and downward movement, no pressure fluid is forced through the pipe 42 and passage 36. When the piston 17 reaches its upward limit of movement, however, pressure is supplied from a supply pipe 44 through a valve 45 and hinged pipes 46 to the pipe 42, thereby supplying fluid for forcing upwardly the piston or ram 34. The valve 45 is actuated by a suitable motor 47 controlled by a switch 48 operated upon the closure of the molds. It will be understood that in this modification the switch 48 is not actuated to open the valve 45 and admit pressure to raise the ram 34 until the molds have been closed, and may be actuated by the final closing movement. In this case the springs 38 operate merely to return the ram 34 and the lever system 29 to original position.

It will be understood that any suitable construction may be employed to carry out the various functions of my apparatus. For example, any suitable support may be provided for supporting the ring 15 in its intermediate position. Also, suitable heating connections may be incorporated. It will also be understood that the hydraulic or fluid actuated mechanism is shown merely as a preferred example and that other sources of power, such as mechanical, electrical, gravity or the tensional pressure of stressed elements, such as springs, may be employed either or both for operating the final core expansion or for opening and closing the molds. The fluid pressure operated mechanism illustrated is, however, a preferred form of the embodiment of the invention.

Through my invention a final compacting of the moldable material is effected after the firm closing of the mold which prevents to a large extent, if not entirely, leakage which would result in spues.

What I claim is:

1. Mold apparatus for tires and the like which comprises a pair of complementary annular mold shell elements, an expansible metal core between said elements, fluid operated means to close said mold shell elements and to expand said core and means to delay the operation of said core expanding means until said mold shell elements are closed.

2. Mold apparatus for tires and the like which comprises a mold shell formed of a fixed side element, a movable side element and a ring element between said side elements, fluid operated mechanism for moving said movable side element toward said fixed side element to close said mold shell, an expansible metal core movable with said fluid operated means and a second fluid operated mechanism carried by said first fluid operated means to expand said metal core after the closing of said mold shell elements and spring elements on said first mentioned fluid operated mechanism to hold said second fluid operated mechanism from operation until the closing of said mold elements.

3. Mold apparatus for tires and the like which comprises a fixed upper side element, a movable lower side element and an intermediate ring forming a mold shell, a hydraulically operated main piston for raising and lowering said lower side element, an expansible metal core carried by said main piston, means actuated by said main piston to expand said core partly, and a fluid operated ram on said main piston to complete the expansion of said core after the closing of said mold.

4. Mold apparatus for tires and the like which comprises a fixed upper side element, a movable lower side element and an intermediate ring forming a mold shell, a hydraulically operated main piston for raising and lowering said lower side element, an expansible metal core carried by said main piston, means actuated by said main piston to expand said core partly, a fluid operated ram on said main piston to complete the expansion of said core after the closing of said mold and springs on said piston to hold said ram from operation until the closing of said molds.

5. Molding apparatus for tires and the like which comprises an upper side element, a movable lower side element and an intermediate ring forming a mold shell, a main actuating piston for raising and lowering said lower side element to close and open position, an expansible metal core carried on said main piston, a ram carried on said main piston to expand said core and means on said main piston to restrain the operation of said ram until the closing of said shell.

HARRY WILLSHAW,